(12) United States Patent
Nagl

(10) Patent No.: US 6,488,738 B2
(45) Date of Patent: Dec. 3, 2002

(54) METHOD OF PRODUCING MOLTEN METAL

(75) Inventor: Michael Nagl, Reichenau (AT)

(73) Assignees: Voest-Alpine Industrieanlagenbau GmbH (AT); Research Institute of Industrial Science & Technology, Inc (KR)

( * ) Notice: Subject to any disclaimer, the term of this patent is extended or adjusted under 35 U.S.C. 154(b) by 0 days.

(21) Appl. No.: 09/966,078

(22) Filed: Oct. 1, 2001

(65) Prior Publication Data

US 2002/0008337 A1 Jan. 24, 2002

Related U.S. Application Data

(62) Division of application No. 09/333,433, filed on Jun. 15, 1999, now Pat. No. 5,944,871, which is a continuation of application No. PCT/AT97/00277, filed on Dec. 6, 1997.

(30) Foreign Application Priority Data

Dec. 17, 1996 (AT) .......................................... A 2205/96

(51) Int. Cl.$^7$ ............................................... C21B 13/14
(52) U.S. Cl. ............................. 75/414; 75/445; 75/446; 75/501
(58) Field of Search .......................... 75/501, 491, 492, 75/445, 446, 414

(56) References Cited

U.S. PATENT DOCUMENTS

| | | | |
|---|---|---|---|
| 2,418,394 A | 3/1942 | Brown | 75/26 |
| 4,396,421 A | * 8/1983 | Stift et al. | 75/10.22 |
| 4,493,732 A | 1/1985 | Melcher et al. | 75/24 |
| 4,699,655 A | * 10/1987 | Milionis | 266/160 |
| 5,948,139 A | * 9/1999 | Kepplinger et al. | 266/182 |

FOREIGN PATENT DOCUMENTS

| | | |
|---|---|---|
| EP | 0010627 | 5/1980 |
| EP | 0111176 | 6/1984 |
| EP | 0174291 | 3/1986 |
| EP | 0217331 | 4/1987 |
| EP | 0576414 | 12/1993 |
| EP | 0594557 | 4/1994 |
| GB | 882909 | 11/1961 |
| GB | 2085480 | 4/1982 |

* cited by examiner

Primary Examiner—Melvyn Andrews
(74) Attorney, Agent, or Firm—Ostrolenk, Faber, Gerb & Soffen, LLP

(57) ABSTRACT

A combustion chamber in a melter gasifier extends into a fluidized bed to isolate fine particulate ore introduced into the chamber from the remaining internal portion of the melter gasifier. The fine particulate ore is melted in the chamber and falls on the bed to be reduced as it trickles down to the molten metal in the melter gasifier bottom. Reducing gases withdrawn from the melter gasifier are filtered through the bed, thereby preventing the fine particulate ore from being withdrawn with the gases. The chamber can be liquid cooled and use a burner to provide combustion temperatures.

14 Claims, 1 Drawing Sheet

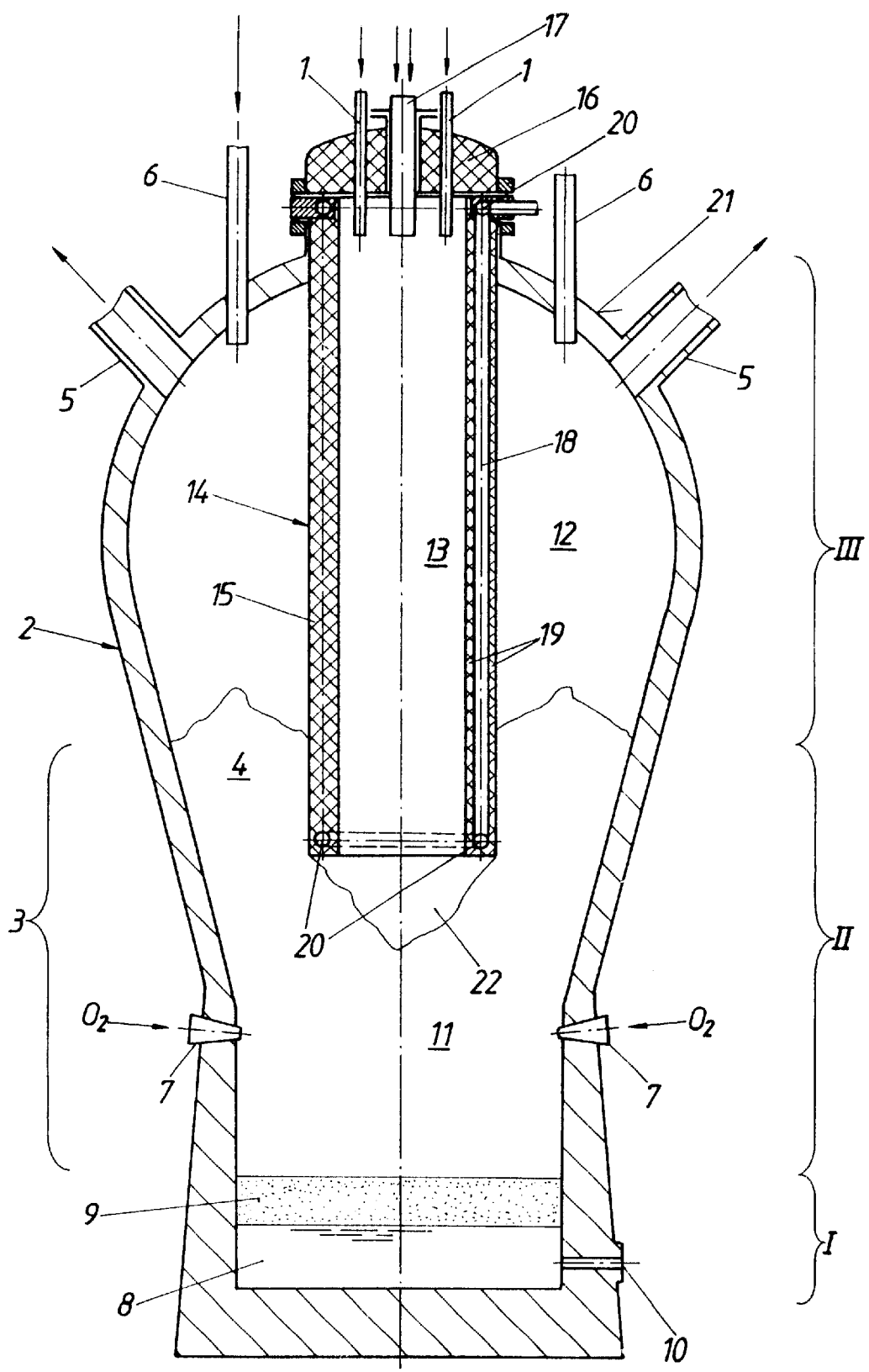

METHOD OF PRODUCING MOLTEN METAL

This is a division of application Ser. No. 09/333,433, filed on Jun. 15, 1999, now U.S. Pat. No. 5,944,871 which is a continuation of International Application PCT/AT97/00277, with an International filing date of Dec. 6, 1997.

BACKGROUND OF THE INVENTION

The invention relates to a method of producing molten metal, in particular pig iron or steel pre-products, from at least partially fine-particulate metal carriers, in particular partially reduced or reduced sponge iron, in a melter gasifier. Carbon-containing material and oxygen or an oxygen-containing gas are supplied to the melter gasifier with simultaneous formation of a reducing gas in a bed formed of solid carbon carriers. The metal carriers are melted, optionally upon previous complete reduction. The present invention also relates to a melter gasifier for carrying out the method.

From EP-B-0 010 627 it is known to feed particulate iron-containing material, such as pre-reduced sponge iron, through a centrally arranged charging opening in the hood of a melter gasifier. The particles drop into the melter gasifier by the effect of gravity and slow their descent in the fluidized bed existing within the melter gasifier. Coal in lumpy form is charged through a charging opening arranged laterally in the hood of the melter gasifier or in a dome covering the melter gasifier towards a top, also under the influence of gravity. The reducing gas formed in the melter gasifier is withdrawn through the centrally arranged charging opening for the iron-containing material.

A process of this kind is not suitable for processing fine-particle metal carriers, in particular fine-particle sponge iron. The pronounced gas flow of the reducing gas formed in the gasification zone and withdrawn through the central charging opening arranged in the hood or in the dome of the melter gasifier carries the fine-particle metal carriers out of the melter gasifier. The temperature in the upper region of the melter gasifier, i.e. in the region above the gasification zone, is too low to ensure a melt-down, thereby contributing to an unwanted discharge of the fine-particle metal carriers. A higher temperature would provide agglomeration of the fine particles at the charging site to form bigger particles which in spite of the ascending gas stream could sink down into the gasification zone.

From EP-A -0 217 331 it is known to introduce pre-reduced fine ore into a melter gasifier and to completely reduce and melt it by means of a plasma burner while supplying a carbon-containing reducing agent. The pre-reduced fine ore or the song-iron powder respectively is fed to a plasma burner provided in the lower section of the melter gasifier. A disadvantage of this method is that by supplying the pre-reduced fine ore directly in the lower meltdown region, i.e. in the region where the melt collects, complete reduction can no longer be ensured and the chemical composition necessary for further processing the pig iron cannot be achieved. Moreover, the charging of major amounts of pre-reduced fine or is not feasible due to a fluidized or fixed bed formed from coal in the lower region of the melter gasifier. The fluidized or fixed bed prevents removal of a sufficient quantity of the melting products from the high-temperature zone of the plasma burner. The charging of major amounts of pre-reduced fine ore would lead to instant thermal and mechanical failure of the plasma burner.

From EP-B-0 111 176 it is known to feed a fine grain fraction of sponge iron particles into the melter gasifier through a downpipe projecting from the head of the melter gasifier into the proximity of the coal fluidized bed. At the end of the downpipe a baffle plate is provided for minimizing the velocity of the fine grain fraction, resulting in a very low exit velocity of the fine grain fraction from the downpipe. At the charging site, the temperature in the melter gasifier is very low, whereby immediate melting of the supplied fine grain fraction is prevented. This and the low exit velocity from the downpipe cause a substantial portion of the supplied fine grain fraction to be carried out of the melter gasifier again together with the reducing gas generated in the same. The charging of a major amount of sponge iron particles containing a fine portion or of only a fine grain fraction is not feasible in accordance with this method.

From EP-A-0 594 557 it is known to charge a fine grain fraction of sponge iron by means of a conveying gas directly into the fluidized bed formed by the gasification zone in the melter gasifier. However, this procedure is disadvantageous, since the gas circulation of the fluidized bed may be disturbed to form obstructions of the fluidized bed. The fluidized bed acts like a filter and the obstructions can ensue as a consequence of the fine grain fraction that is blown directly into the fluidized bed. As a result, eruptive outbreaks of gas may occur which will break up the clogged fluidized bed. Hereby, the gasification process for the carbon carriers and also the melt-down process for the reduced iron ore are markedly disturbed.

From EP-A-0 576 414 it is known to feed fine-particle metal carriers into the gasification zone via dust burners. This method exhibits a poor melt-in performance, which is due to a short dwelling time of the particles in the hot flame.

SUMMARY OF THE INVENTION

The invention aims to avoid these disadvantages and difficulties and has as its object to provide a method of the kind initially described as well as a melter gasifier for carrying out the method. According to the present invention the processing of fine-particulate metal carriers can be conducted without the need for briquetting. The present invention reliably avoids discharging supplied fine-particulate metal carriers, optionally in pre-reduced or in completely reduced condition, by the reducing gas produced in the melter gasifier. The present invention also ensures complete reduction, which may optionally be required, of the fine particles. It is a particular object of the invention to provide a method enabling the processing of a majority of a charge, preferably 100%, of which is/are made up of fine-particulate iron-containing material provided to pig iron and/or steel prematerial utilizing a melter gasifier.

With a method of the initially described kind, the above objects are achieved in that the fine-particulate metal carriers are charged to a high-temperature combustion zone maintained by a combustion process. The carriers, optionally upon complete reduction, are melted in the high-temperature combustion zone which is spatially isolated from the freeboard of the melter gasifier that is located above the bed and extends into the bed. The offgases formed in the high-temperature combustion zone exit by passing through at least a portion of the bed. The offgases are also cooled in the bed and are withdrawn from the melter gasifier along with the reducing gas formed within the bed.

A melter gasifier for carrying out the method according to the present invention has feed ducts for oxygen-containing gases, carbon carriers and metal carriers. The melter gasifier has at least one gas discharge duct for discharging a reducing gas produced in a bed of the melter gasifier. The reducing gas produced from the bed is formed of solid carbon carriers departing from the bed. The melter gasifier includes a tap for the metal melt and a tap for slag with at least one feed duct for feeding fine-particulate metal carriers. The feed duct opens into at least one high-temperature combustion chamber that is spatially isolated form the interior of the melter gasifier. The feed duct has a mouth that projects into the bed formed of solid carbon carriers and is provided with a burner.

To assure easy access to the high-temperature combustion chamber as well as a long service life of the same, the high-temperature combustion chamber is advantageously constructed as a wall that departs from the dome of the melter gasifier, is open at the bottom, cylindrical in shape and provided with a refractory material.

A simple construction for the chamber includes a single high-temperature combustion chamber, which is arranged centrally and with its longitudinal axis lying in the vertical longitudinal axis of the melter gasifier.

Advantageously, the high-temperature combustion chamber projects outward at its upper end through the dome of the melter gasifier. The feed duct for fine-particulate metal carriers runs into the high-temperature combustion chamber at this exterior end. The burner is arranged centrally at an outer end of the feed duct, whereby repair work to be done on the burner or exchange of the same is feasible in an easy manner.

An ideal structure of the bed is attainable if according to a preferred embodiment feed ducts for carbon carriers project through the dome of the melter gasifier at a radial distance from the high-temperature combustion chamber.

The service life can be further increased if the wall of the high-temperature combustion chamber is provided with an internal wall cooling. The wall of the high-temperature combustion chamber is accordingly equipped with finned tubes through which a cooling medium flows and the tubes are provided with a refractory lining on both sides. At the upper end and at the lower end of the high-temperature combustion chamber there are suitably provided ring-shaped headers for a cooling medium, preferably cooling water, each being integrated into the wall of the high-temperature combustion chamber.

At its end projecting outward through the dome of the melter gasifier, the high-temperature combustion chamber suitably is provided with a removable cover and the burner and the feed duct are arranged in the cover.

It is beneficial to the melt process if the burner is formed by a fine-coal/oxygen burner.

BRIEF DESCRIPTION OF THE DRAWINGS

In the following, the invention is explained in more detail with reference to an exemplary embodiment represented in the drawing, wherein the FIGURE illustrates a melter gasifier in vertical longitudinal section in schematic representation.

DETAILED DESCRIPTION OF THE PREFERRED EMBODIMENTS

Pre- or completely reduced fine ore—in case of iron-containing fine ore this will be sponge iron power—is supplied to a melter gasifier 2 through at least one conveying duct 1 in a manner that will be described in more detail below. In the melter gasifier 2, reducing gas containing $CO-$ and $H_2-$ is produced from coal 4 while oxygen-containing gas in a gasification zone 3 and is fed, for example, into a fluidized bed reactor (not illustrated) via a reducing-gas discharge duct 5. The reducing gas streams through this fluidized bed reactor are in counterflow to the ore flow in order to reduce fine-particulate iron-oxide-containing material and is discharged from the fluidized bed reactor via a top-gas discharge duct, is subsequently cooled and scrubbed in a wet scrubber and then is available to consumers as a top gas.

The melter gasifier 2 is provided with supply ducts 6 for solid carbon carriers in lumpy form and supply ducts 7 for oxygen-containing gases. Optional supply ducts can be used to provide carbon carriers, such as hydrocarbons, that are liquid or gaseous at room temperature and can also provide burned fluxes.

In the melter gasifier 2, in a lower section I below the gasification zone 4, molten pig iron 8 or molten steel pre-material respectively and molten slag 9 collect, which are tapped off via a tap 10.

In a section II of the melter gasifier 2 arranged above the lower section I a bed 11 is formed from the solid carbon carriers, preferably a fixed bed and/or a fluidized bed. The upper section III provided above the central section II serves as a calming space 12 for the reducing gas forming in the melter gasifier 2 and for solid particles entrained by the reducing gas.

The pre- or completely reduced fine ore is charged into the gasification zone 3 via a high-temperature combustion zone 13 arranged vertically and centrally in the melter gasifier 2, into which zone there enters the conveying duct 1—by several branch ducts. The high-temperature combustion zone 13 is provided in a high-temperature combustion chamber 14 penetrating the dome of the melter gasifier 2 and projecting downward into the bed 11. It is constructed so as to be cylindrical and open at the bottom and is provided with a wall 15 designed to be refractory.

The high-temperature combustion changer 14 is at its upper end provided with a removable cover 16 through which the conveying duct 1 with the branch ducts is conducted. Centrally in the cover 16, a burner 17, preferably a fine-coal/oxygen burner, is arranged whose flame jet is directed vertically downward.

The wall 15 of the high-temperature combustion chamber 14 is provided with an internal wall cooling formed by finned tubes 18 through which flows a cooling medium. On both sides of the finned tubes 18, a refractory lining 19 is arranged. At the upper end and at the lower end of the high-temperature combustion chamber 14, ring-shaped headers 20 for the cooling medium, preferably cooling water, are arranged, each being integrated into the wall 15 of the high-temperature combustion chamber 14.

The feed ducts 6 for the solid lumpy carbon carriers project through the dome 21 of the melter gasifier 2 at a radial distance outside of the high-temperature combustion chamber 14. As can be seen from the FIGURE, the bed 11 will form radially outside of the high-temperature combustion chamber 14, in a ring-like shape. Below the high-temperature combustion chamber 14 there will form a cavern 22 of roughly conical shape.

In the high-temperature zone 13 maintained by means of the burner 17, the sponge iron powder is melted for the most part, and preferably entirely. The sponge iron powder melt enters the bed 11 or the combustion zone 3, respectively, in liquid condition. The melted sponge iron trickles downward through the coke network that forms the bed 11 and is carburized in the process. The hot offgases originating in the high-temperature combustion zone 13 enter the bed 11 from the cone-shaped zone that is free from piled-up material, i.e., the cone-shaped cavern 22, and together with the reducing gas formed in the gasification zone 3 flow upwards via the annular bed radially adjacent the combustion chamber 14 and are carried off via the reducing-gas discharge ducts 5. In flowing through the bed 11, the offgases cool down to the desired offgas temperature of roughly 1000° C.

In accordance with the invention, melting thus takes place entirely or at least almost entirely above the bed 11, whereby the residence time of the sponge iron in the melter gasifier 2 is considerably increased. Furthermore, discharges of sponge iron powder from the melter gasifier 2 are greatly reduced since the sponge iron powder is supplied directly to the bed 11 in the downward direction, with the offgases formed in the high-temperature combustion zone 13. Here, melt droplets are filtered off from the offgases by means of the bed 11, so that the operation of the melter gasifier 2 is markedly enhanced as compared with the prior art.

The invention is not limited to the illustrated exemplary embodiment but may be modified in various respects. In particular, utilization for metals other than iron, especially copper (oxidic, sulfidic), tin, lead (metallic, oxidic or sulfidic), nickel and chromium—the last two in the form of ore—is available according to the present invention. It is also feasible to charge a portion of the sponge iron to the bed 11 in lumpy form, e.g., as pellets, namely outside of the high-temperature combustion zone 13, the zone 3 thus having to be denoted not just as a gasification zone but also as a melt-down gasifying zone.

Utilization for oxidic charging substances, such as e.g., unreduced iron oxide or oxidic copper, tin, lead, is also energetically feasible. In that case, a prereduction and a complete reduction would take place in the high-temperature zone, and a supply of oxygen and coal is increased.

What is claimed is:

1. A method of producing iron based molten metal from at least partially fine-particulate metal carriers in a melter gasifier, comprising:

supplying the melter gasifier with a carbon-containing material and a gas composed at least of oxygen;

simultaneously forming a reducing gas in a bed formed of solid carbon carriers in the melter gasifier;

maintaining by a combustion process a high-temperature combustion zone spatially isolated from the freeboard of the melter gasifier, separate from and above the bed and extending into the bed;

charging the metal carriers to the combustion zone;

melting the metal carriers in the combustion zone;

passing offgases formed in the combustion zone though at least a portion of the bed cooling the offgases by passing them through the portion of the bed; and withdrawing from the melter gasifier the offgases that have passed through the portion of the bed from the combustion zone and also withdrawing from the melter gasifier the reducing gas formed within the bed of the melter gasifier.

2. A method according to claim 1, wherein the molten metal is at least one of pig iron and steel pre-products.

3. A method according to claim 1, wherein the metal carriers are at least one of partially reduced sponge iron and fully reduced sponge iron.

4. A method according to claim 1, wherein the melted metal carriers are obtained from a previous complete reduction.

5. A method for producing molten carriers from fine-particulate metal, comprising:

forming in a melter gasifier a fluid permeable bed composed of carbon carriers;

forming a high temperature combustion zone in the melter gasifier, the combustion zone being spatially separated from and extending into the bed;

introducing metal carriers into the combustion zone;

forming off fluids in the combustion zone; and exhausting fluids from melter gasifier such that off fluids in the combustion zone are drawn through the bed before being exhausted from the melter gasifier.

6. A method according to claim 5, further comprising cooling the off fluids passing through the bed.

7. A method according to claim 5, wherein the combustion zone occupies a spatial region separate from the bed.

8. A method according to claim 5, further comprising melting the metal carriers in the combustion zone.

9. A method according to claim 5, further comprising providing a burner communicating with the combustion zone and contributing heat to the combustion zone.

10. A method according to claim 5, further comprising cooling a delimiting portion of the combustion zone.

11. A method according to claim 10, wherein the cooling is provided by passing cooling fluid through a wall delimiting the combustion zone.

12. A method according to claim 11, wherein the wall is provided with finned tubes through which the cooling fluid passes.

13. A method according to claim 12, wherein the finned tubes are provided with a refractory lining.

14. A method for producing molten metal, comprising:

arranging a high temperature combustion chamber in a melter gasifier, with a bottom end of the combustion chamber extending into a fluid permeable bed comprised of carbon carriers;

melting metal carriers introduced into the chamber, such that the melted metal carriers contact the bed in liquid form; and exhausting offgases formed in the chamber through the bed and out of the melter gasifier, such that the exhausted offgases have metal carriers removed by passage through the bed.

* * * * *

UNITED STATES PATENT AND TRADEMARK OFFICE
CERTIFICATE OF CORRECTION

PATENT NO. : 6,488,738 B2  
DATED : December 3, 2002  
INVENTOR(S) : Michael Nagl et al.

It is certified that error appears in the above-identified patent and that said Letters Patent is hereby corrected as shown below:

<u>Title page,</u>
Item [73], Assignee, should read
-- Voest-Alpine Industrieanlagenbau GmbH (AT)
Pohang Iron & Steel Co., Ltd. (KR)
Research Institute of Industrial Science & Technology Incorporated Foundation (KR) --

Signed and Sealed this

Twenty-ninth Day of July, 2003

JAMES E. ROGAN
*Director of the United States Patent and Trademark Office*